US011288089B2

(12) United States Patent
Davies (10) Patent No.: US 11,288,089 B2
(45) Date of Patent: Mar. 29, 2022

(54) METRICS-BASED VIRTUAL MACHINE SNAPSHOTS

(71) Applicant: Citrix Systems, Inc., Fort Lauderdale, FL (US)

(72) Inventor: Jonathan Davies, Cambridge (GB)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 612 days.

(21) Appl. No.: 15/602,715

(22) Filed: May 23, 2017

(65) Prior Publication Data

US 2018/0341513 A1    Nov. 29, 2018

(51) Int. Cl.
*G06F 9/455*   (2018.01)
*G06F 9/46*    (2006.01)
*G06F 11/14*   (2006.01)
*G06F 11/30*   (2006.01)

(52) U.S. Cl.
CPC .......... *G06F 9/461* (2013.01); *G06F 9/45558* (2013.01); *G06F 11/1451* (2013.01); *G06F 11/1461* (2013.01); *G06F 11/301* (2013.01); *G06F 11/3055* (2013.01); *G06F 2009/45562* (2013.01); *G06F 2009/45575* (2013.01); *G06F 2009/45591* (2013.01); *G06F 2201/81* (2013.01)

(58) Field of Classification Search
CPC .................................................. G06F 9/45558
See application file for complete search history.

(56) References Cited

U.S. PATENT DOCUMENTS

| 2009/0037680 | A1* | 2/2009 | Colbert | G06F 3/0617 |
| | | | | 711/162 |
| 2014/0331226 | A1  | 11/2014 | Arcese et al. | |
| 2014/0365740 | A1* | 12/2014 | Vasilyev | G06F 11/1451 |
| | | | | 711/162 |
| 2015/0212893 | A1* | 7/2015 | Pawar | G06F 11/1448 |
| | | | | 707/649 |
| 2017/0124326 | A1  | 5/2017 | Wailly et al. | |

* cited by examiner

*Primary Examiner* — Charlie Sun
(74) *Attorney, Agent, or Firm* — Allen, Dyer, Doppelt + Gilchrist, PA (57) ABSTRACT

A computing server includes a hardware platform with hardware resources, with at least a portion of the hardware resources to be allocated as virtualized resources. A hypervisor platform is provided based on execution of code instructions by the hardware platform. A virtual machine operates as an independent guest computing device, with at least a portion of the virtualized resources being allocated by the hypervisor platform to the virtual machine. The hypervisor platform includes a snapshot function to save the state of the virtual machine, a virtual machine activity monitor to monitor activity of the virtual machine, and an activity-based snapshot policy engine to activate the snapshot function based on the monitored activity of the virtual machine exceeding an activity threshold metric.

21 Claims, 5 Drawing Sheets

METRICS-BASED VIRTUAL MACHINE SNAPSHOTS

TECHNICAL FIELD

The present disclosure relates to computer virtualization, and more particularly, to a hypervisor platform that takes a snapshot of a virtual machine based on the activity of the virtual machine.

BACKGROUND

In a virtual machine, it is common practice to enumerate a virtual disk and a virtual memory with the assistance of a hypervisor platform. The hypervisor platform is able to save the state of the virtual machine at a point in time. This is referred to as a snapshot. The hypervisor platform is also able to revert the virtual machine to the state when the snapshot was taken.

A user can thus make a virtual machine go back to a particular point in its history. Automated snapshots are time-based and are a way of preserving the history of a virtual machine without explicit human intervention. This is often used as a safeguard against mistakes made in the virtual machine.

The problem is that scheduled (i.e., time-based) snapshots do not know anything about what has happened in the virtual machine since the previous snapshot. For example, if a large number of changes have been made in the virtual machine then this might mean an undesirably large jump between snapshot n and snapshot n+1. On the other hand, if a small number of changes have been made in the virtual machine then disk space is unnecessarily consumed by storing a new snapshot which does not substantially differ from the previous one.

SUMMARY

A computing server includes a hardware platform, a hypervisor platform, and at least one virtual machine. The hardware platform may include hardware resources, with at least a portion of the hardware resources to be allocated as virtualized resources. The hypervisor platform may be provided based on execution of code instructions by the hardware platform. The virtual machine may operate as an independent guest computing device, with at least a portion of the virtualized resources being allocated by the hypervisor platform to the virtual machine.

The hypervisor platform may include a snapshot function to save the state of the virtual machine, a virtual machine activity monitor to monitor activity of the virtual machine, and an activity-based snapshot policy engine to activate the snapshot function based on the monitored activity of the virtual machine exceeding at least one activity threshold metric.

The activity-based snapshot policy engine advantageously provides a more useful collection of snapshots than time-based scheduled snapshots. The hypervisor platform automatically takes snapshots of each virtual machine via the snapshot function when one or more metrics available to the hypervisor platform have reached their respective activity thresholds. This avoids a snapshot of a virtual machine from having too large or too small a number of changes from a previous snapshot.

Once a respective activity threshold has been reached, then the virtual machine activity monitor resets to zero the monitoring for this particular activity once a snapshot has been taken. Alternatively, when more than one activity is being monitored by the virtual machine activity monitor, then all of the activities being monitored are reset to zero after any one of the monitored activities reaches its threshold. After a respective reset of a monitored activity or a system reset of all of the monitored activities, the virtual machine activity monitor continues to monitor activity of the virtual machine until the next activity threshold is reached.

The virtual machine activity monitor may be configured to monitor different activities of the virtual machine, and the snapshot function may be based on activity of the virtual machine exceeding a combination of different activity threshold metrics corresponding to the different activities being monitored by the virtual machine activity monitor. The hardware platform may comprise a user interface coupled to the activity-based snapshot policy engine, and the combination of different activity threshold metrics may be selected via the user interface.

The virtualized resources allocated to the virtual machine may include a virtual disk, wherein the virtual machine activity monitor may be configured to monitor data being written to the virtual disk, and wherein the at least one activity threshold metric may be based on a threshold amount of data written to the virtual disk.

The virtualized resources allocated to the virtual machine may comprise a virtual disk divided into a plurality of sectors, wherein the virtual machine activity monitor may be configured to monitor data being written to the plurality of sectors, and wherein the at least one activity threshold metric may be based on a threshold percentage of the plurality of sectors receiving data.

The virtualized resources allocated to the virtual machine may include a virtual memory, wherein the virtual machine activity monitor may be configured to monitor data being written to memory pages in the virtual memory, and wherein the at least one activity threshold metric may be based on a threshold amount of memory pages being overwritten.

The virtualized resources allocated to the virtual machine may include a virtual processor, wherein the virtual machine activity monitor may be configured to monitor the virtual processor, and wherein the at least one activity threshold metric may be based on a threshold number of instructions being executed by the virtual processor.

The virtualized resources allocated to the virtual machine may include a virtualized network interface, wherein the virtual machine activity monitor may be configured to monitor the virtualized network interface, and wherein the at least one activity threshold metric may be based on a threshold amount of network traffic sent or received by the virtual machine via the virtualized network interface. The virtualized network interface may also be configured to monitor a threshold number of peers communicated with via the virtualized network interface.

Another aspect of the disclosure is directed to a method for operating a computing server as described above. The method comprises providing a hypervisor platform based on execution of code instructions by the hardware platform, and providing a virtual machine operating as an independent guest computing device, with at least a portion of the virtualized resources being allocated by the hypervisor platform to the virtual machine. A snapshot function is provided within the hypervisor platform to save the state of the virtual machine. The method may further include monitoring activity of the virtual machine, and activating the snapshot function based on the monitored activity of the virtual machine exceeding at least one activity threshold metric.

Yet another aspect of the disclosure is directed to a non-transitory computer readable medium having a plurality of computer executable instructions for causing the computing server to perform the method steps as described above.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
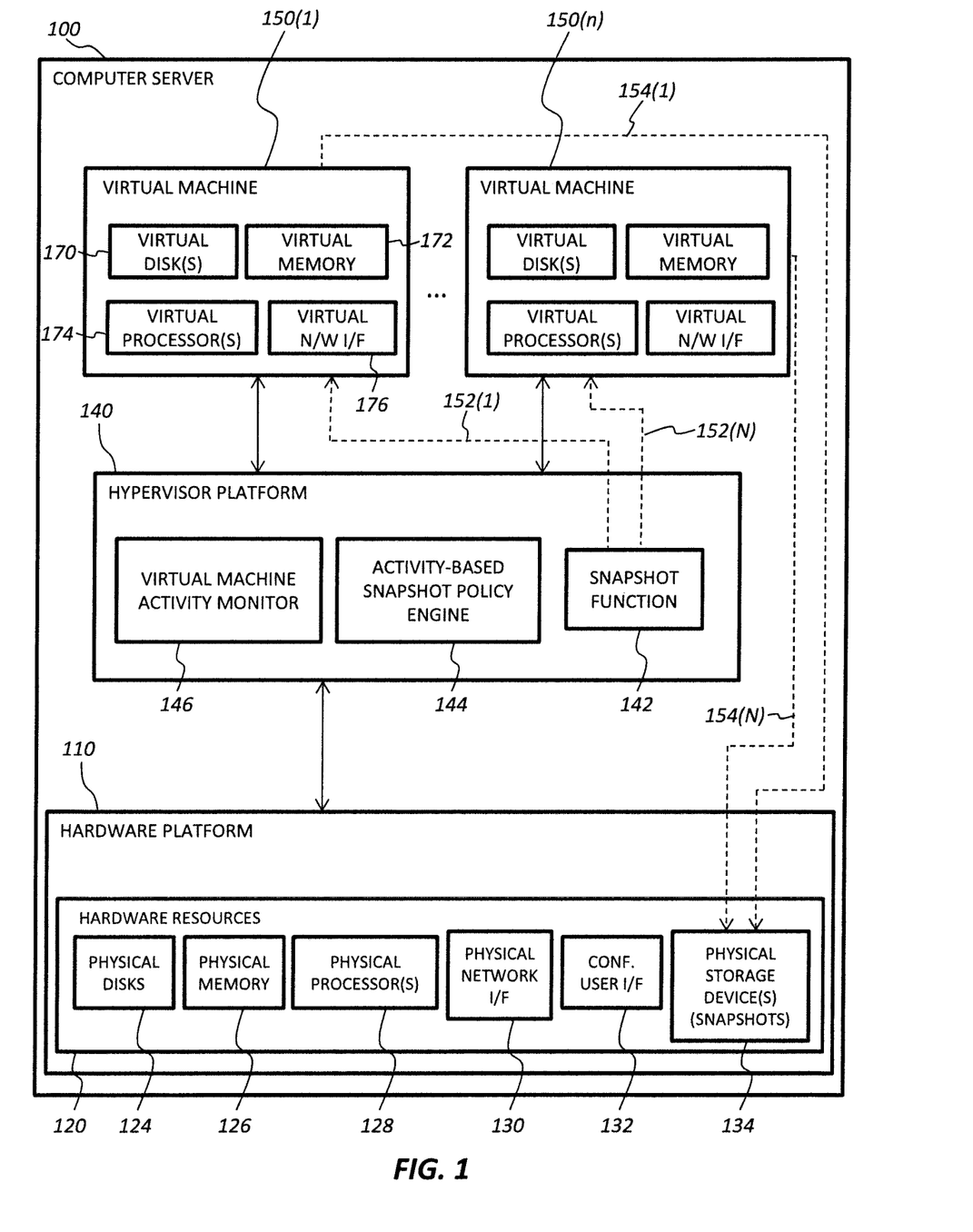
FIG. 1 is a block diagram of a computing server with an activity-based snapshot policy engine in accordance with the present disclosure.

Referring initially to FIG. 1, a computing server 100 with an activity-based snapshot policy engine 144 for determining when snapshots of virtual machines 150(1)-150(n) are taken will be discussed. For discussion purposes, the virtual machines 150(1)-150(n) may be generally referred to by reference 150. The computing server 100 includes a hardware platform 110, a hypervisor platform 140, and the virtual machines 150.

The hardware platform 110 includes hardware resources 120, with at least a portion of the hardware resources to be allocated as virtualized resources by the hypervisor platform 140. The hypervisor platform 140 may also be referred to as a virtual machine manager, and allows multiple operating systems, termed guests, to run concurrently on the computing server 100. The hypervisor platform 140 is adapted to virtualize the hardware resources 120 of the host computing server 100 in order to supply the virtual machines 150 with the resources they need.

The hypervisor platform 140 is thus provided based on execution of code instructions by the hardware platform 110. Each virtual machine 150 thus operates as an independent guest computing device, with at least a portion of the virtualized resources being allocated by the hypervisor platform 140 to each respective virtual machine 150.

The hypervisor platform 140 includes a snapshot function 142, a virtual machine activity monitor 146, and an activity-based snapshot policy engine 144. The snapshot function 142 is configured to save the state of each virtual machine 150(1)-150(n), as indicated by dashed lines 152(1)-152(n). Storage of the snapshots taken of the illustrated virtual machines 150(1)-150(n) are represented by dashed lines 154(1)-154(n). Storage of a snapshot in general of a virtual machine 150 is represented by reference 154.

The snapshot function 142 allows a particular state of a virtual machine 150 to be saved so that at any later time an administrator or end user can revert to that earlier state. In order to restore the state of a virtual platform 150 to one of its previous states, the hypervisor platform 140 allows restoring of a given snapshot. In doing so, the state of the virtual machine 150 is restored.

The hardware resources 120 include a physical storage device 134 for storing snapshots of the virtual machines 150. Alternatively, the snapshots may be stored external the computing server 100.

The virtual machine activity monitor 146 is configured to monitor activity of each virtual machine 150. The activity-based snapshot policy engine 144 is configured to activate the snapshot function 142 based on the monitored activity of each virtual machine 150 exceeding at least one activity threshold metric.

The activity-based snapshot policy engine 144 advantageously provides a more useful collection of snapshots than time-based scheduled snapshots. The hypervisor platform 140 automatically takes snapshots of each virtual machine 150 via the snapshot function 142 when one or more activity metrics available to the hypervisor platform 140 have reached their respective activity thresholds. This avoids a snapshot of a virtual machine 150 from having too large or too small a number of changes from a previous snapshot.

Once a respective activity threshold has been reached, then the virtual machine activity monitor 146 resets the monitoring for this particular activity once a snapshot 154 has been taken. Alternatively, when more than one activity is being monitored by the virtual machine activity monitor 146, then all of the activities being monitored are reset after any one of the monitored activities reaches its threshold. The virtual machine activity monitor 146 continues to monitor the virtual machine 150 until the next activity threshold is reached.

There are a number of activity threshold metrics that are available to the virtual machine activity monitor 146 within the hypervisor platform 140. These activity threshold metrics will now be discussed in reference to FIG. 2. Each virtual machine 150 thus has one or more activity threshold metrics associated therewith.

Figure 2:
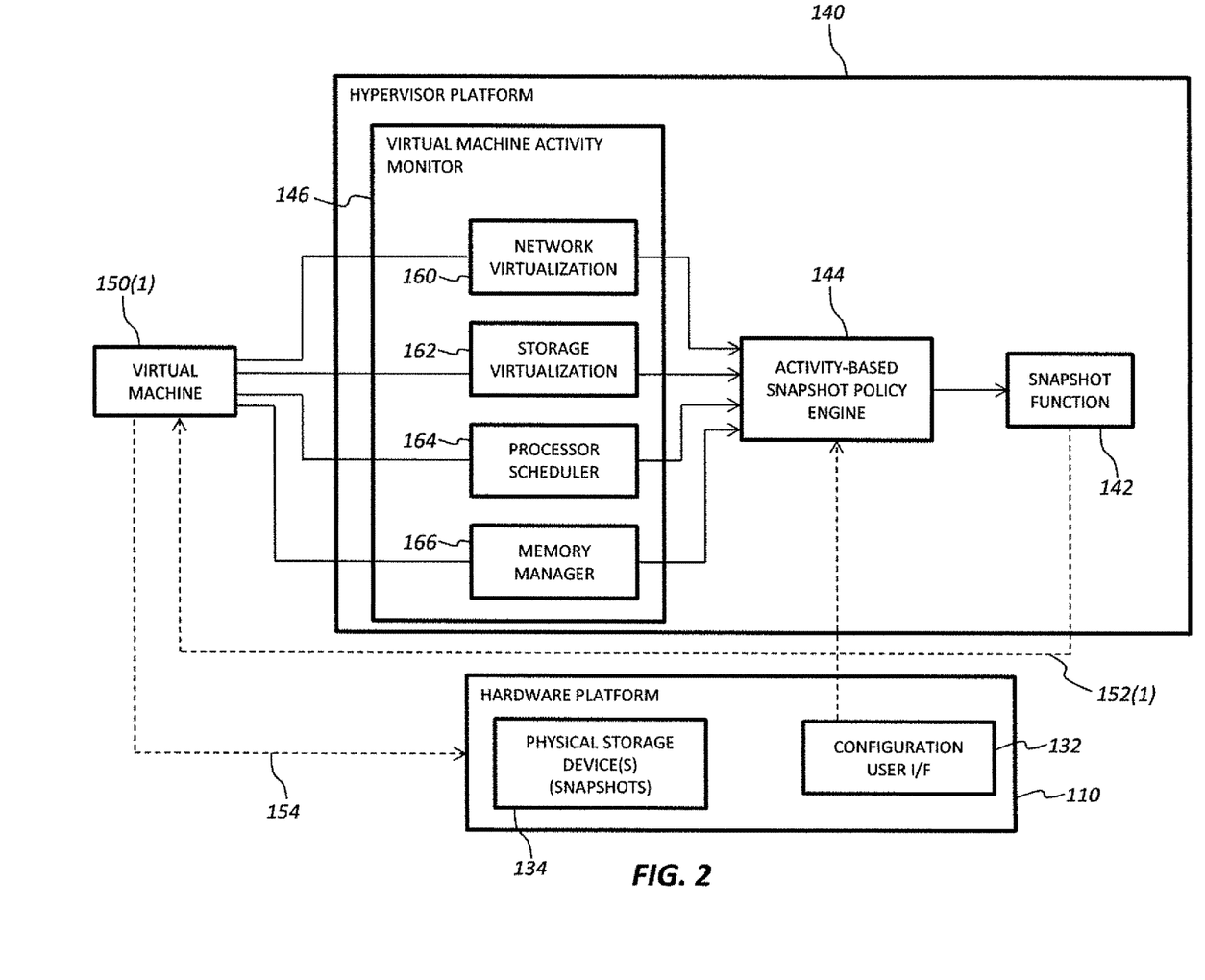
FIG. 2 is a more detailed block diagram of the hypervisor platform illustrated in FIG. 1.

The hardware resources 120 within the hardware platform 110 include one or more physical disks 124, physical memory 126, one or more physical processors 128, and a physical network interface 130. The virtualized resources allocated to each virtual machine 150 may include at least one virtual disk 170, virtual memory 172, at least one virtual processor 174, and a virtual network interface 176. The virtual disk 170 is non-volatile memory whereas the virtual memory 172 is volatile memory.

One of the activity threshold metrics is associated with the virtual disk 170 allocated to a virtual machine 150. The virtual machine activity monitor 146 is configured to monitor data being written to the virtual disk 170 via the storage virtualization module 162. The activity threshold metric is based on a threshold amount of data written to the virtual disk 170.

For example, when 100 MB of data has been written to the virtual disk 170, then the activity-based policy engine 144 activates the snapshot function 142, where dashed line 154(1) represents the snapshot being stored in the physical storage device 134. A configuration user interface 132 within the hardware resources 120 is connected to the activity-based policy engine 144 to allow an administrator or end user to set this activity threshold metric to a desired level.

Another activity threshold metric is associated with the sectors of the virtual disk 170 allocated to the virtual machine 150. The virtual machine activity monitor 146 is configured to monitor data being written to the sectors via the storage virtualization module 162. The number of sectors in a virtual disk 170 may be in the tens of millions, for example. The activity threshold metric is based on a threshold percentage of the sectors receiving data, and does not take into account how much data is actually written as in the above activity threshold metric.

For example, when 1% of the sectors have been written to, then the activity-based policy engine 144 activates the snapshot function 142. The configuration user interface 132 allows the administrator or end user to set this activity threshold metric to a desired percentage level.

Another activity threshold metric is associated with the virtual memory 172 allocated to the virtual machine 150. The virtual machine activity monitor 146 is configured to monitor data being written to memory pages in the virtual memory 172 via the memory manager module 166. The virtual memory 172 may be 4 GB, for example. The activity threshold metric is based on a threshold percentage of memory pages being overwritten.

For example, when 1% of the memory pages have been overwritten, then the activity-based policy engine 144 activates the snapshot function 142. The configuration user interface 132 allows the administrator or end user to set this activity threshold metric to a desired percentage level.

Another activity threshold metric is associated with the virtual processor 174 allocated to the virtual machine 150. The virtual machine activity monitor 146 is configured to monitor activity of the virtual processor 174 via the processor scheduler module 164. The activity threshold metric is based on a threshold number of instructions being executed by the virtual processor 174.

For example, when a billion instructions have been executed by the virtual processor 174, then the activity-based policy engine 144 activates the snapshot function 142. The configuration user interface 132 allows the administrator or end user to set this activity threshold metric to a desired number level.

Another activity threshold metric is associated with the network traffic being sent or received by the virtual machine 150 via the virtual network interface 176. The virtual machine activity monitor 146 is configured to monitor network traffic being sent and received by the virtual machine 150 via the network virtualization module 160. The network virtualization module 160 also interfaces with the physical network interface 130 in the hardware resources 120. The activity threshold metric is based on a threshold amount of network traffic sent or received by the virtual machine 150.

For example, when 100 MB of data has been downloaded from the virtual machine 150 via its virtualized network interface 176, then the activity-based policy engine 144 activates the snapshot function 142. Similarly, when 100 MB of data has been uploaded to the virtual machine 150 via its virtualized network interface 176, then the activity-based policy engine 144 also activates the snapshot function 142. The configuration user interface 132 allows the administrator or end user to set the activity uplink and downlink threshold metrics to desired levels.

Still referring to the virtual network interface 176, the virtual machine activity monitor 146 may be configured to monitor a threshold number of peers that communicate with the virtual machine 150. When the threshold number of peers has been met, then the activity-based policy engine 144 activates the snapshot function 142.

The above activity threshold metrics are not to be limiting. Other activity threshold metrics may be used by the activity-based snapshot policy engine 144 to activate the snapshot function 142, as readily appreciated by those skilled in the art.

Each of the individual activity metrics indicate a respective amount of activity performed within the virtual machine 150, any one of which may be used by the activity-based snapshot policy engine 144 to activate the snapshot function 142. Alternatively, the hypervisor platform 140 may combine several of the activity threshold metrics into a single, high-level virtual machine metric. Users less concerned with the details could choose this option to base their automated snapshot policy on.

Another aspect is directed to a method for operating the computing server 100 for performing metrics-based virtual machine snapshots as discussed above. Referring to the flowchart 200 in FIG. 3, the method comprises from the start (Block 202), providing a hypervisor platform 140 at Block 204 based on execution of code instructions by the hardware platform 110, and providing at least one virtual machine 150 at Block 206 operating as an independent guest computing device. At least a portion of the virtualized resources are allocated by the hypervisor platform 140 to the at least one virtual machine 150. A snapshot function 142 is provided within the hypervisor platform 140 to save the state of the at least one virtual machine 150 at Block 208. The method further includes monitoring activity of the at least one virtual machine 150 at Block 210, and activating the snapshot function 142 at Block 212 based on the monitored activity of the at least one virtual machine 150 exceeding at least one activity threshold metric. The method ends at Block 214.

Figure 3:
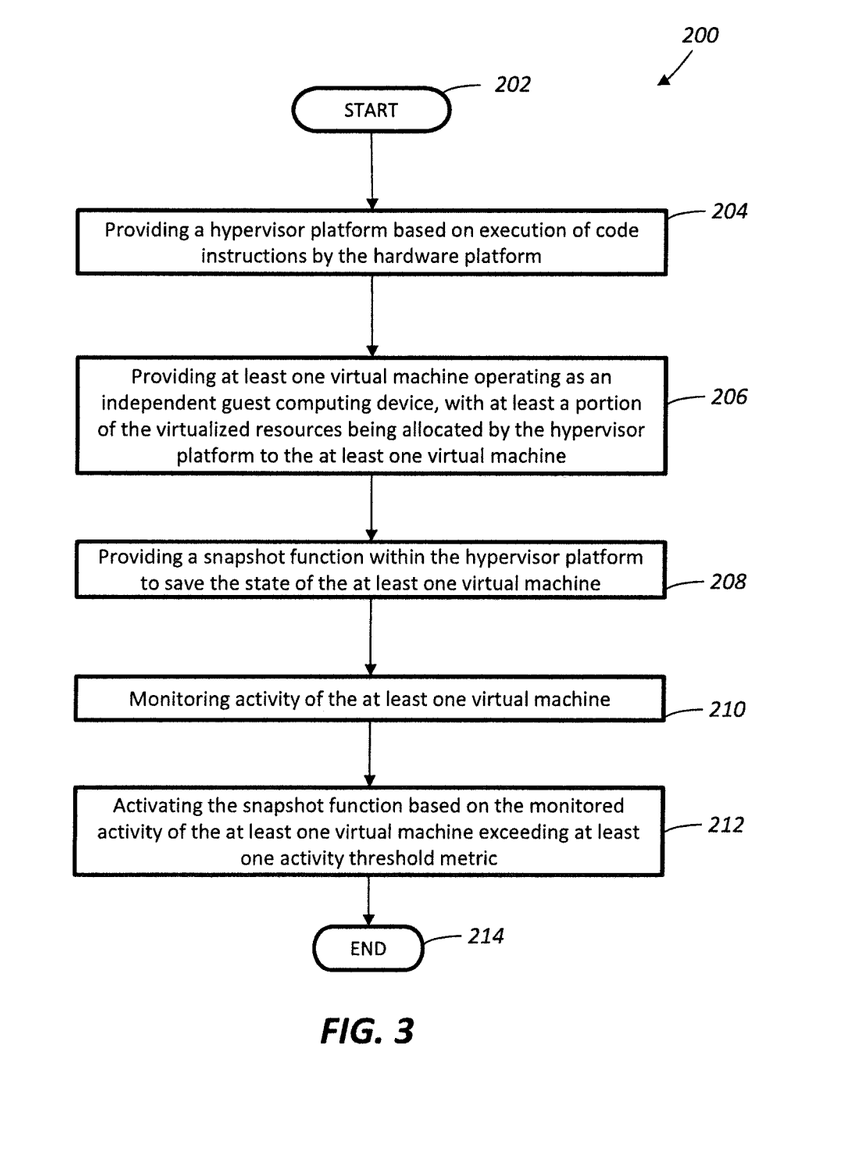
FIG. 3 is a flowchart illustrating a method for operating the computing server illustrated in FIG. 1.

The flowchart 200 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Figure 4:
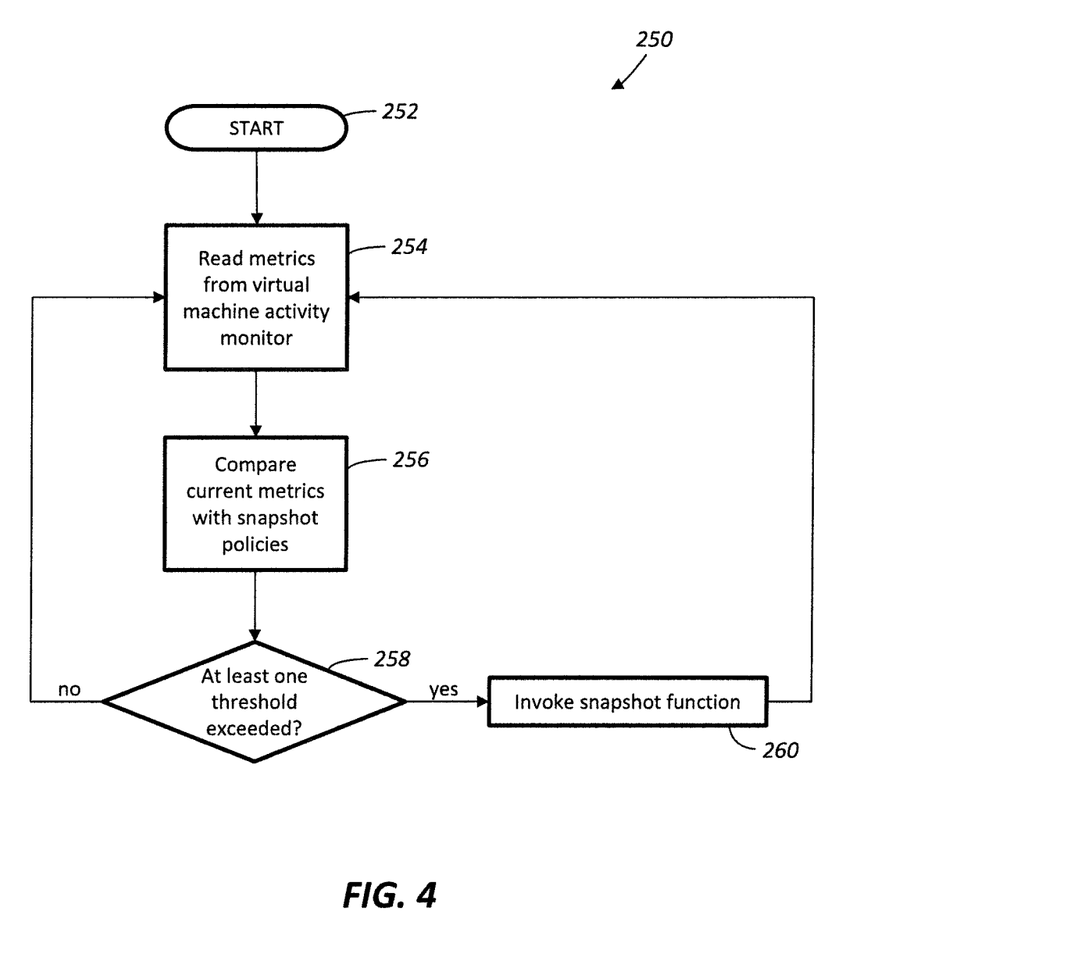
FIG. 4 is a flowchart illustrating a method for operating the virtual machine activity monitor illustrated in FIG. 1.

Another aspect is directed to a method for operating the virtual machine activity monitor 146 as discussed above. Referring to the flowchart 250 in FIG. 4, the method comprises from the start (Block 252), reading activity metrics from the virtual machine activity monitor 146 at Block 254. The current activity metrics for the virtual machine 150 are compared with the snapshot policies as determined by the activity-based snapshot policy engine 144. If at least one of the activity thresholds is reached or exceeded at Block 258, then the snapshot function is invoked at Block 260. If none of the activity thresholds are reached or exceeded at Block 258, then the method returns back to Block 254 to continue reading activity metrics.

Yet another aspect is directed to a non-transitory computer readable medium having a plurality of computer executable instructions for causing the computing server 100 to perform the method steps as described above. More particularly, the computing server 100 is operated to provide a hypervisor platform 140 based on execution of code instructions by the hardware platform 110, and provide at least one virtual machine 150 operating as an independent guest computing device, with at least a portion of the virtualized resources being allocated by the hypervisor platform 140 to the at least one virtual machine 150. A snapshot function 142 is provided within the hypervisor platform 140 to save of the at least one virtual machine 150. The computing server 100 further monitors activity of the at least one virtual machine 150, and activates the snapshot function 142 based on the monitored activity of the at least one virtual machine 150 exceeding at least one activity threshold metric.

Figure 5:
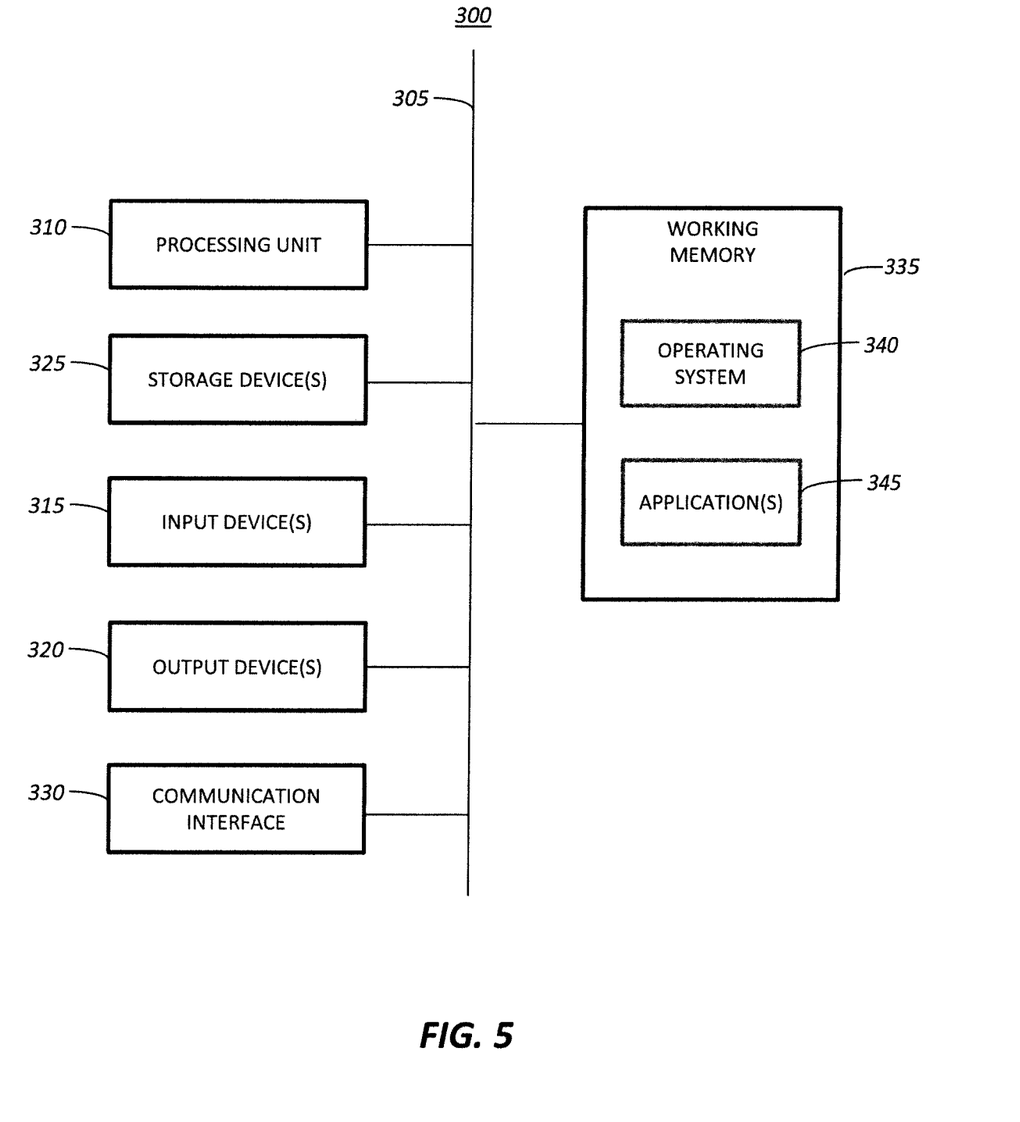
FIG. 5 is a more detailed generalized block diagram of a computing system providing the hardware platform illustrated in FIG. 1.

Various aspects of the hardware platform will now be discussed in a generalized manner in reference to a computer system 300 illustrated in FIG. 5. The computer system 300 is meant only to provide a generalized illustration of various components, any or all of which may be utilized as appropriate. The computer system 300, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include a processing unit 310, including without limitation one or more general-purpose processors and/or one or more special-purpose processors (such as digital signal processing chips, graphics acceleration processors, or other appropriate data processor); one or more input devices 315, which can include without limitation a mouse, a keyboard, a touchscreen, a global positioning system (GPS) receiver, a motion sensor, a camera, and/or the like; and one or more output devices 320, which can include without limitation a display device, a speaker, a printer, and/or the like.

The computer system 300 may further include (and/or be in communication with) one or more non-transitory computer-readable storage mediums or devices 325, which can comprise, without limitation, local and/or network accessible storage, and/or can include, without limitation, a disk drive, a drive array, an optical storage device, a solid-state storage device such as a random access memory (RAM) and/or a read-only memory (ROM), which can be programmable, flash-updateable and/or the like. Such storage devices may be configured to implement any appropriate data stores, including without limitation, various file systems, database structures, and/or the like.

The computer system 300 might also include a communication interface 330, which can include without limitation a modem, a network card (wireless or wired), an infrared communication device, a wireless communication device and/or chipset (such as a Bluetooth™ device, an 802.11 device, a WiFi device, a WiMax device, an NFC device, cellular communication facilities, etc.), and/or similar communication interfaces. The communication interface 330 may permit data to be exchanged with a network (such as the network described below, to name one example), other computer systems, and/or any other devices described herein.

In many embodiments, the computer system 300 will further comprise a non-transitory working memory 335, which can include a RAM or ROM device, as described above. The computer system 300 may further include one or more receivers and one or more transmitters. For example, the communication interface 330 may include one or more receivers and one or more transmitters. In another example, the computer system 300 may include one or more transceivers, one or more receivers, and/or one or more transmitters that are separate from the communication interface 330.

The computer system 300 also can comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the one or more non-transitory computer-readable storage mediums or devices 325 described above. In some cases, the storage medium might be incorporated within a computer system, such as computer system 300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system.

Some embodiments may employ a computer system (such as the computer system 300) to perform methods in accordance with the disclosure. For example, some or all of the procedures of the described methods may be performed by the computer system 300 in response to processing unit 310 executing one or more sequences of one or more instructions (which might be incorporated into the operating system 340 and/or other code, such as an application program 345) contained in the working memory 335. Such instructions may be read into the working memory 335 from another computer-readable medium, such as one or more of the storage device(s) 325. Merely by way of example, execution of the sequences of instructions contained in the working memory 335 might cause the processing unit 310 to perform one or more procedures of the methods described herein.

In an embodiment implemented using the computer system 300, various computer-readable storage media might be involved in providing instructions/code to processing unit 310 for execution and/or might be used to store and/or carry such instructions/code (e.g., as signals). In many implementations, a computer-readable storage medium is a physical and/or tangible storage medium. Such a medium may take many forms, including but not limited to, non-volatile media, volatile media, and transmission media.

Non-volatile media include, for example, optical and/or magnetic disks, such as the storage device(s) 325. Volatile media include, without limitation, dynamic memory, such as the working memory 335. Transmission media include, without limitation, coaxial cables, copper wire and fiber optics, including the wires that comprise the bus 305, as well as the various components of the communication interface 330 (and/or the media by which the communication interface 330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a non-transitory storage device 325 either before or after execution by the processing unit 310.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

That which is claimed:

1. A computing server comprising:
   a hardware platform comprising hardware resources and a user interface, with at least a portion of said hardware resources to be allocated as virtualized resources, and wherein a combination of different activity threshold metrics is selected via the user interface;
   a hypervisor platform being provided based on execution of code instructions by said hardware platform; and
   at least one virtual machine operating as an independent guest computing device, with at least a portion of the virtualized resources being allocated by said hypervisor platform to said at least one virtual machine;
   said hypervisor platform comprising:
      a snapshot function configured to save a state of said at least one virtual machine,
      a virtual machine activity monitor configured to monitor different activities of said at least one virtual machine, with the different activity threshold metrics corresponding to the different activities being monitored, and
      an activity-based snapshot policy engine coupled to the user interface of said hardware platform and configured to activate said snapshot function after one of the monitored activities of said at least one virtual machine has exceeded at least one activity threshold metric.

2. The computing server system according to claim 1 wherein said snapshot function is based on activity of said at least one virtual machine exceeding a single high-level virtual machine metric that is based on a combination of the different activity threshold metrics being monitored by said virtual machine activity monitor.

3. The computing server system according to claim 1 wherein the virtualized resources allocated to said at least one virtual machine comprises a virtual disk, wherein said virtual machine activity monitor is configured to monitor data being written to the virtual disk, and wherein the at least one activity threshold metric is based on a threshold amount of data written to the virtual disk.

4. The computing server system according to claim 1 wherein the virtualized resources allocated to said at least one virtual machine comprises a virtual disk divided into a plurality of sectors, wherein said virtual machine activity monitor is configured to monitor data being written to the plurality of sectors, and wherein the at least one activity threshold metric is based on a threshold percentage of the plurality of sectors receiving data.

5. The computing server system according to claim 1 wherein the virtualized resources allocated to said at least one virtual machine comprises a virtual memory, wherein said virtual machine activity monitor is configured to monitor data being written to memory pages in the virtual memory, and wherein the at least one activity threshold metric is based on a threshold amount of memory pages being overwritten.

6. The computing server system according to claim 1 wherein the virtualized resources allocated to said at least one virtual machine comprises at least one virtual processor, wherein said virtual machine activity monitor is configured to monitor the at least one virtual processor, and wherein the at least one activity threshold metric is based on a threshold number of instructions being executed by the at least one virtual processor.

7. The computing server system according to claim 1 wherein the virtualized resources allocated to said at least one virtual machine comprises a virtualized network interface, wherein said virtual machine activity monitor is configured to monitor the virtualized network interface, and wherein the at least one activity threshold metric is based on a threshold amount of network traffic sent or received by said at least one virtual machine via the virtualized network interface.

8. The computing server system according to claim 1 wherein the virtualized resources allocated to said at least one virtual machine comprises a virtualized network interface, wherein said virtual machine activity monitor is configured to monitor the virtualized network interface, and wherein the at least one activity threshold metric is based on a threshold number of peers communicated with.

9. A method for operating a computing server comprising a hardware platform comprising hardware resources and a user interface, with at least a portion of the hardware resources to be allocated as virtualized resources, and wherein a combination of different activity threshold metrics is selected via the user interface, the method comprising:
   providing a hypervisor platform based on execution of code instructions by the hardware platform;
   providing at least one virtual machine operating as an independent guest computing device, with at least a portion of the virtualized resources being allocated by the hypervisor platform to the at least one virtual machine;

providing a snapshot function within the hypervisor platform to save a state of the at least one virtual machine;

monitoring different activities of the at least one virtual machine, with the different activity threshold metrics corresponding to the different activities being monitored; and activating the snapshot function after one of the monitored activities of the at least one virtual machine has exceeded at least one activity threshold metric.

10. The method according to claim 9 wherein and activating the snapshot function is based on activity of the at least one virtual machine exceeding a single high-level virtual machine metric that is based on a combination of the different activity threshold metrics being monitored by the virtual machine activity monitor.

11. The method according to claim 9 wherein the virtualized resources allocated to the at least one virtual machine comprises a virtual disk, wherein monitoring activity of the at least one virtual machine comprises monitoring data being written to the virtual disk, and wherein the at least one activity threshold metric is based on a threshold amount of data written to the virtual disk.

12. The method according to claim 9 wherein the virtualized resources allocated to the at least one virtual machine comprises a virtual disk divided into a plurality of sectors, wherein monitoring activity of the at least one virtual machine comprises monitoring data being written to the plurality of sectors, and wherein the at least one activity threshold metric is based on a threshold percentage of the plurality of sectors receiving data.

13. The method according to claim 9 wherein the virtualized resources allocated to the at least one virtual machine comprises a virtual memory, wherein monitoring activity of the at least one virtual machine comprises monitoring data being written to memory pages in the virtual memory, and wherein the at least one activity threshold metric is based on a threshold amount of memory pages being overwritten.

14. The method according to claim 9 wherein the virtualized resources allocated to the at least one virtual machine comprises at least one virtual processor, wherein monitoring activity of the at least one virtual machine comprises monitoring the at least one virtual processor, and wherein the at least one activity threshold metric is based on a threshold number of instructions being executed by the at least one virtual processor.

15. The method according to claim 9 wherein the virtualized resources allocated to said at least one virtual machine comprises a virtualized network interface, wherein monitoring activity of the at least one virtual machine comprises monitoring the virtualized network interface, and wherein the at least one activity threshold metric is based on a threshold amount of network traffic sent or received by the at least one virtual machine via the virtualized network interface.

16. A non-transitory computer readable medium for a computing server comprising a hardware platform comprising hardware resources and a user interface, with at least a portion of the hardware resources to be allocated as virtualized resources, and wherein a combination of different activity threshold metrics is selected via the user interface, the non-transitory computer readable medium having a plurality of computer executable instructions for causing the computing server to perform steps comprising:

providing a hypervisor platform based on execution of code instructions by the hardware platform;

providing at least one virtual machine operating as an independent guest computing device, with at least a portion of the virtualized resources being allocated by the hypervisor platform to the at least one virtual machine;

providing a snapshot function within the hypervisor platform to save a state of the at least one virtual machine;

monitoring different activities of the at least one virtual machine, with the different activity threshold metrics corresponding to the different activities being monitored; and activating the snapshot function after one of the monitored activities of the at least one virtual machine has exceeded at least one activity threshold metric.

17. The non-transitory computer readable medium according to claim 16 wherein activating the snapshot function is based on activity of the at least one virtual machine exceeding a single high-level virtual machine metric that is based on a combination of the different activity threshold metrics being monitored by the virtual machine activity monitor.

18. The non-transitory computer readable medium according to claim 16 wherein the virtualized resources allocated to the at least one virtual machine comprises a virtual disk, wherein monitoring activity of the at least one virtual machine comprises monitoring data being written to the virtual disk, and wherein the at least one activity threshold metric is based on a threshold amount of data written to the virtual disk.

19. The non-transitory computer readable medium according to claim 16 wherein the virtualized resources allocated to the at least one virtual machine comprises a virtual disk divided into a plurality of sectors, wherein monitoring activity of the at least one virtual machine comprises monitoring data being written to the plurality of sectors, and wherein the at least one activity threshold metric is based on a threshold percentage of the plurality of sectors receiving data.

20. The non-transitory computer readable medium according to claim 16 wherein the virtualized resources allocated to the at least one virtual machine comprises at least one virtual processor, wherein monitoring activity of the at least one virtual machine comprises monitoring the at least one virtual processor, and wherein the at least one activity threshold metric is based on a threshold number of instructions being executed by the at least one virtual processor.

21. The non-transitory computer readable medium according to claim 16 wherein the virtualized resources allocated to said at least one virtual machine comprises a virtualized network interface, wherein monitoring activity of the at least one virtual machine comprises monitoring the virtualized network interface, and wherein the at least one activity threshold metric is based on a threshold amount of network traffic sent or received by the at least one virtual machine via the virtualized network interface.

* * * * *